US010007615B1

(12) United States Patent
Gazit et al.

(10) Patent No.: US 10,007,615 B1
(45) Date of Patent: Jun. 26, 2018

(54) METHODS AND APPARATUS FOR PERFORMING FAST CACHING

(71) Applicant: Marvell International Ltd., Hamilton (BM)

(72) Inventors: Hillel Gazit, Palo Alto, CA (US); Sohail Syed, San Jose, CA (US); Gevorg Torjyan, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 27 days.

(21) Appl. No.: 15/144,519

(22) Filed: May 2, 2016

Related U.S. Application Data

(60) Provisional application No. 62/204,299, filed on Aug. 12, 2015, provisional application No. 62/156,039, filed on May 1, 2015.

(51) Int. Cl.
*G06F 12/08* (2016.01)
*G06F 12/0888* (2016.01)
*G06F 12/02* (2006.01)
*G06F 12/0893* (2016.01)
*G06F 17/18* (2006.01)

(52) U.S. Cl.
CPC ........ *G06F 12/0888* (2013.01); *G06F 12/023* (2013.01); *G06F 12/0893* (2013.01); *G06F 17/18* (2013.01); *G06F 2212/60* (2013.01)

(58) Field of Classification Search
CPC .................. G06F 12/0888; G06F 12/0893
See application file for complete search history.

(56) References Cited

U.S. PATENT DOCUMENTS

| 7,809,888 B1* | 10/2010 | Clark | G06F 12/0871 711/118 |
|---|---|---|---|
| 2008/0034115 A1* | 2/2008 | Chu | G06F 17/3033 709/239 |
| 2013/0185508 A1* | 7/2013 | Talagala | G06F 12/0888 711/118 |
| 2014/0052726 A1* | 2/2014 | Amberg | G06F 17/30412 707/737 |
| 2014/0136789 A1* | 5/2014 | Madan | G06F 17/00 711/133 |

OTHER PUBLICATIONS

Computing Life, "Why to hash functions use prime numbers", Nov. 20, 2008.*

* cited by examiner

*Primary Examiner* — Edward J Dudek, Jr.

(57) ABSTRACT

Computer circuitry is provided for fast caching, which includes a memory, a processor, and a cache. The memory stores a data block. The processor retrieves the data block from the memory and determines whether to store the data block in the cache. The cache performs a first hash function on the data block in response to the processor determining to store the data block in the cache. The cache performs a second hash function on the data block if the first hash function results in a collision.

12 Claims, 3 Drawing Sheets

FIG. 2

METHODS AND APPARATUS FOR PERFORMING FAST CACHING

CROSS REFERENCE TO RELATED APPLICATIONS

This claims the benefit of commonly-assigned U.S. Provisional Patent Application No. 62/156,039, filed May 1, 2015, and Provisional Patent Application No. 62/204,299, filed Aug. 12, 2015, each of which is hereby incorporated by reference herein in its respective entirety.

FIELD OF USE

Implementations of the subject matter of this disclosure generally pertain to apparatus and methods for performing fast caching by way of multiple levels of hashes. In particular, implementations of the subject matter of this disclosure pertain to apparatus and methods for reducing hash collisions, thereby reducing delays and cache misses in the cache.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

Computer systems usually include, at least, a memory and a processor. Although memories can be accessed relatively quickly (e.g., each access taking a few hundred clock cycles), it is increasingly viewed as a bottleneck to high speed systems as the processor must pause execution of a current instruction in order to wait for the memory access to complete. In other words, the processor pipeline can become more efficient with a faster mechanism for data and instruction fetching. To alleviate this problem, modern computer systems have implemented high-speed storage solutions in the vicinity of the processor itself. This fast, local storage, called cache, sits in between the processor and the main memory and store frequently-accessed information found on the main memory. When the processor needs a particular copy of data or instruction, it first looks into the caches. If the data or instruction is found in the cache (i.e., a cache hit), the processor can quickly resume operation without any delay. Conversely, if the data or instruction is not found in the cache (i.e., a cache miss), it would have to be loaded from the main memory and then supplied to the processor.

SUMMARY

In order to reduce cache misses, the most useful information (as determined by one or more caching algorithms) must be optimally stored in the cache. The present invention discloses systems, apparatus, and methods to implement multi-level hashing in a cache to assure constant delay in access time and very low probability of failure. It is the further intent of the present invention to provide illustrative hardware implementations for this fast caching method.

According to some implementations of the present invention, computer circuitry for fast caching includes a memory that stores a data block. The computer circuitry further includes a processor that retrieves the data block from the memory, and determines whether to store the data block in a cache. The computer circuitry further includes the cache that performs a first hash function on the data block in response to the processor determining to store the data block in the cache, and performs a second hash function on the data block if the first hash function results in collision.

In some implementations of the present invention, the computer circuitry further includes a content-addressable memory that stores the data block if the second hash function results in collision. In some implementations of the present invention, the cache of the computer circuitry performs the first hash function based on a prime number, and performs the second hash function based on an integer. In some implementations of the present invention, the prime number and the integer are co-prime.

In some implementations of the present invention, the cache performs the first hash function based on the prime number by evaluating a number of buckets corresponding to a first hash table in the cache. In some implementations, the number of buckets equals the prime number. In some implementations, the cache further performs the first hash function based on the prime number by performing the first hash function on the data block to generate a hash value. In some implementations, the cache further performs the first hash function based on the prime number by generating an index based on the prime number and the hash value. In some implementations, the cache further performs the first hash function based on the prime number by determining whether a bucket corresponding to the index is available.

In some implementations of the present invention, the cache performs the second hash function based on the integer. In some further implementations, the cache can perform four different hash functions, each hash function corresponding to a hash table implemented within the cache. In some implementations of the present invention, the cache of the computer circuitry has a size that is greater than or equal to a sum of the prime number and the integer.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which:

FIG. 2 shows illustrative hash tables as used in accordance with an implementation of the subject matter of this disclosure.

DETAILED DESCRIPTION

As discussed above, a cache can sit between the processor and the memory in a computer system to provide fast access to critical information. To achieve this, in some embodiments, the cache needs to be populated with information that is most likely to be used by the processor. However, caches usually have a very limited size as compared to the associated memory. Therefore, strategic decisions must be made to allow only the most likely information to be fetched into the cache, or stay in the cache, or both.

For example, three information blocks (or "data entries") A, B, and C may already exist in a hypothetical cache having a size of four blocks, as shown in Table 1 below. Blocks 0 and 1 belong to Set 0; and blocks 2 and 3 belong to Set 2. If the processor requires information block X, which is not found in the cache, the processor will fetch block X from the main memory, and make a determination as to whether block X is important enough to keep within the cache. The processor may determine that this is merely a one-off request and block X is not important at all. In this case, block X will not be written into the cache. If, however, the processor determines that block X is important, it may decide to write block X to the remaining block available in the cache, or displace an existing information block in the cache, e.g., by replacing information block A with information block X. The former (i.e., writing block X to the available "Block 3" bucket) may happen if the cache is fully associative; whereas the latter may happen if the cache is direct-mapped, or set associative.

TABLE 1

Example cache with four blocks.

| Set | Bucket | Entry |
|---|---|---|
| Set 0 | Block 0 | A |
|  | Block 1 | B |
| Set 1 | Block 2 | C |
|  | Block 3 |  |

In a direct-mapped or a set associative cache, an important information block may be overwritten (e.g., block A overwritten by block D) or discarded (e.g., block D discarded because of Block A) in the event of a conflict, as illustrated by the example above. This is referred to as a "conflict miss." In some embodiments, caches can be implemented as hash tables, and information may be mapped to the buckets and sets of a cache using a hash function. A hash function, on average, produces O(1) access time to the information stored in a cache. However, traditional hash functions utilize the least significant bits (LSB) of the information's address as the hash key, and therefore are time consuming and may accidentally delete information that is not "old." The present disclosure illustrates methods and apparatus to reduce conflict misses using novel hash functions in a multi-level configuration.

Figure 1:
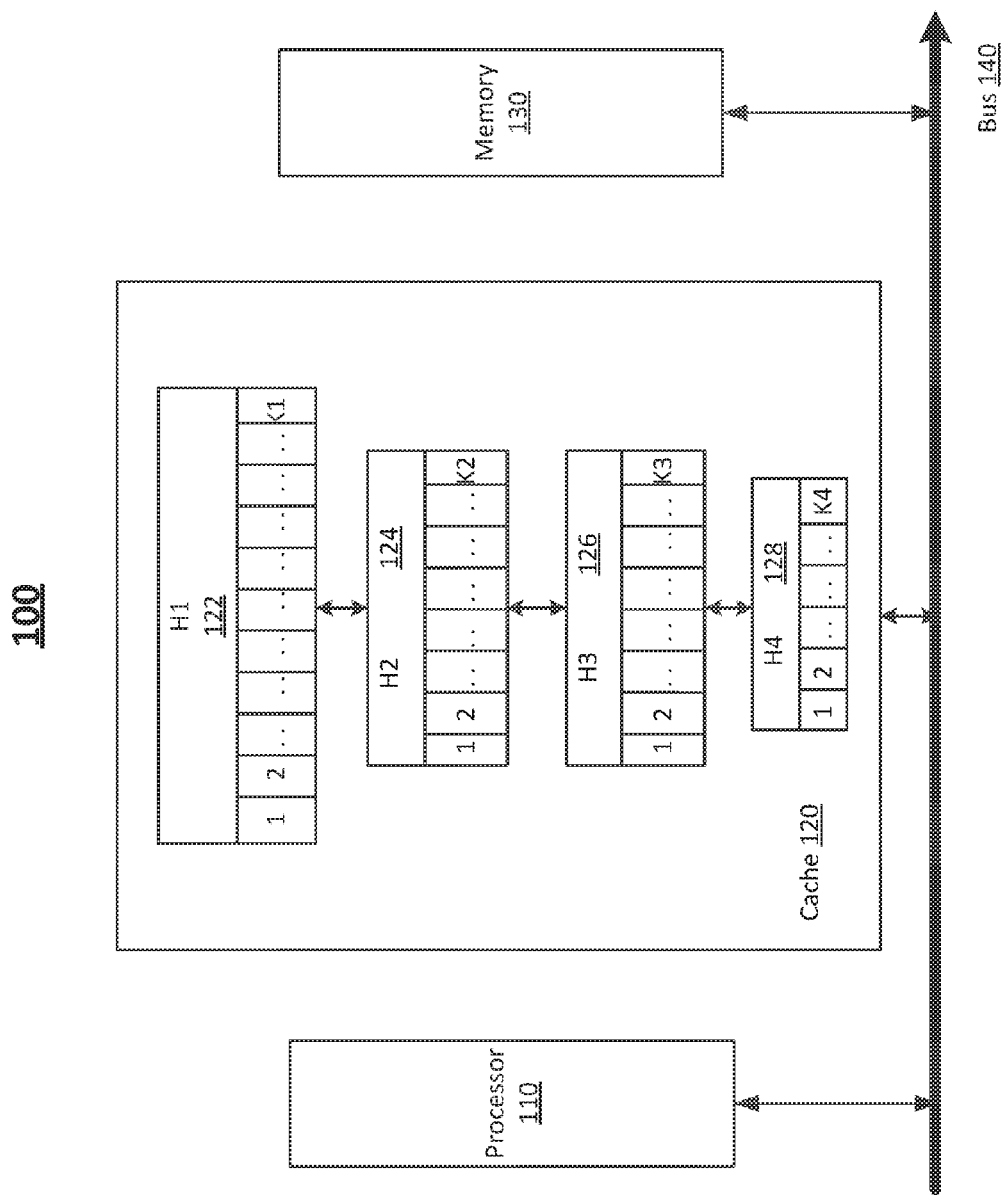
FIG. 1 shows a computer system for performing fast caching according to implementations of the subject matter of this disclosure.

FIG. 1 shows a computer system for performing fast caching according to implementations of the subject matter of this disclosure. Computer system 100 includes processor 110, cache 120, memory 130, and bus 140. As shown, processor 110, cache 120, and memory 130 are all in communication with each other by way of bus 140. In some embodiments, cache 120 implements one or more hash tables, such as Hash Table One ("H1") 122, Hash Table Two ("H2") 124, Hash Table Three ("H3") 126, and Hash Table Four ("H4") 128. The number of hash tables shown in FIG. 2 for Cache 120 is illustrative in nature and non-limiting. A person skilled in the art would understand that the number of hash tables can be fewer, or more than the illustrative four-hash-table cache described herein.

Consistent with the examples above, each of the hash tables 122, 124, 126, and 128 may be of different sizes. For example, H1 122 may be a hash table of size K1, H2 124 a hash table of size K2, H3 126 a hash table of size K3, and H4 128 a hash table of size K4. In an exemplary embodiment, when processor 110 requests a completely new information block, e.g., block X, processor 110 may not be able to find the information block in any hash tables within the cache and consequently must retrieve it from memory 130 directly, via bus 140.

Once the information block is retrieved, processor 110 may determine whether to store it in cache 120. The determination can be made based on any caching algorithm, such as a least-recently-used ("LRU") algorithm. For instance, processor 110 may attempt to store the information block in H1 122, at block 0, but may be unable to do so because block 0 of H1 122 may have been occupied (i.e., storing the information block at block 0 would have caused a collision). Subsequently, processor 110 may attempt to store the information block in H2 124, at block 2, but may not be able to do so either, as block 2 of H2 124 may have been occupied as well. Processor 110 may repeat this process until it finds an available block, e.g., in H4 128, for the information block.

As explained above, if processor 110 is unable to find any available blocks throughout every hash table of the caches (due to hash collisions), processor 110 may simply store the information block in a CAM. Alternatively, in the event that the CAM is full, or is otherwise unavailable, processor 110 may evict an existing information block (i.e., an "old entry") from one of the hash tables of cache 120 to make space. For example, the old entry at block 0 of H1 may be deleted to store the new information block.

In some embodiments, it is not necessary for the hash table of a cache to be nearly full before hash collisions begin to occur. For example, in a hash table of 100 blocks, the probability of having a hash collision rises up to 50% when the number of entries is 23, i.e., when less than a quarter of the blocks are filled. Due to this observation, it is essential for the hash tables of cache 120 to have optimal or near optimal sizes (e.g., $K_1$, $K_2$, $K_3$, and $K_4$ of FIG. 2) in order to have an efficient utilization of the computer system.

Figure 2:
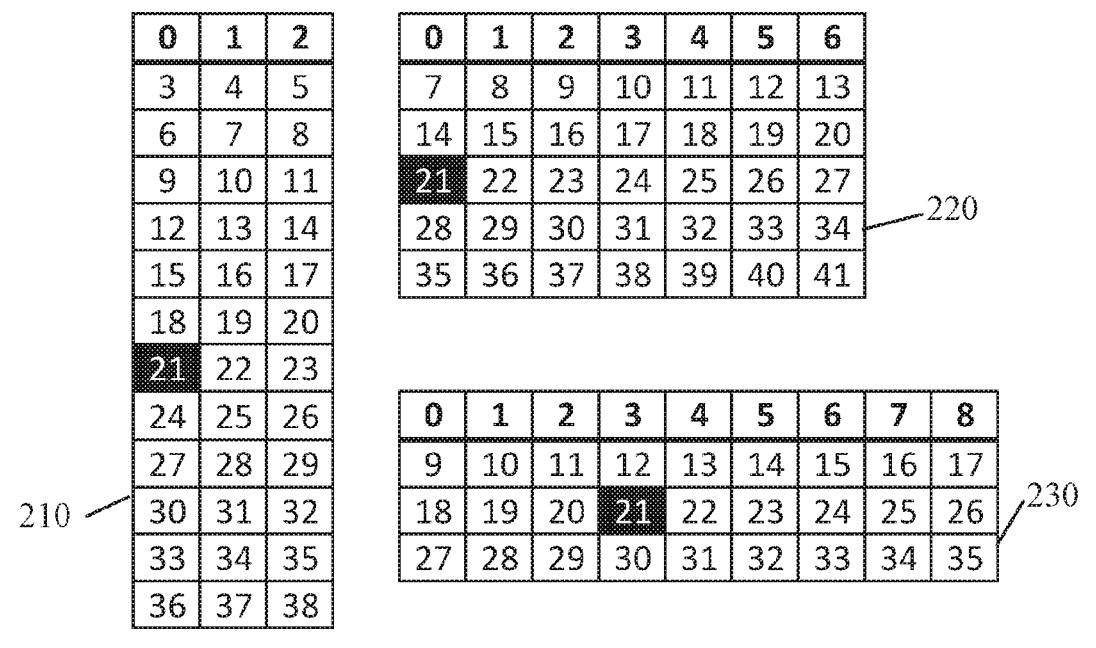

FIG. 2 shows illustrative hash tables as used in accordance with an implementation of the subject matter of this disclosure. As shown, hash tables 210, 220, and 230 may be used to implement cache 120, for example, as hash tables 122, 124, 126, or 128. As illustrated, the hash tables use a simple modulo operation as hash functions. Hash table 210 uses modulo-3 as its hash function, hash table 220 uses modulo-7 as its hash function, and hash table 230 uses modulo-9 as its hash function. In this manner, hash table 210 has 3 blocks (or "buckets"), hash table 220 has 7 blocks, and hash table 230 has 9 blocks.

In some embodiments, each bucket of a hash table corresponds to an index. An incoming data block (e.g., a hash key) may be processed via a hash function to produce a hash value. The hash value is stored at its corresponding index within the hash table. When one or more hash values point to the same hash index, a hash collision occurs. In the examples of FIG. 2, the first row of each hash table represents the index. In hash table 210, if hash value 3 already occupies the bucket indicated by index 0, then a subsequent attempt to write hash value 9 to the same bucket would cause a hash collision.

In some embodiments, the number of blocks, or buckets, that each hash table contains is equivalent to the hash table size k represented in FIG. 1. Illustratively, if H2 122 of FIG. 1 implements hash table 210, $K_1$=3; if H4 128 implements hash table 230, $K_4$=9; etc.

A processor, such as processor 110 of FIG. 1, may allocate an information block or data entry to a particular hash table. For instance, processor 110 will allocate an information block with the value of 5 to block 2 of hash table 210. As another example, processor 110 will allocate an information block with the value of 24 to block 6 of hash table 230.

In an illustrative embodiment, processor 110 may attempt to allocate the following information data entries to the multi-level hash tables of FIG. 2:

3, 5, 7, 14, 21

The following allocation scheme will take place in this illustrative embodiment:

Entry 3 will be written to block 0 of hash table 210.
Entry 5 will be written to block 2 of hash table 210.
Entry 7 will be written to block 1 of hash table 210.
Entry 14 will be written to block 0 of hash table 220, as it cannot be written to block 2 of hash table 210, due to conflict (or "hash collision").
Entry 21 will be written to block 3 of hash table 230, as it cannot be written to block 0 of hash table 210 or block 0 of hash table 220, due to conflict.

In the illustrative embodiment above, if processor 110 requests two additional information blocks, the cache may run into a hash collision and may have to discard an existing entry. For example, processor 110 may request the following additional information blocks:

9, 30

In accordance with the tables in FIG. 2, entry 9 will be written to block 2 of hash table 220, and entry 30 will face a conflict on every hash table. Thus, in a cache of total size 19 (i.e., size 3 for H1, size 7 for H2, and size 9 for H3), a hash collision has already occurred when only 6 of the 19 blocks are occupied.

In an exemplary embodiment of the present disclosure, the general situation of placing x entries in a hash table of size n is distilled from the above observation. Assuming that incoming data entries can be randomly allocated to the buckets of a hash table using the modulo operation discussed above, the probability ($p_1$) of a specific data entry being allocated to a specific block (bucket) of the hash table is:

$$p_1 = \frac{1}{n} \tag{1}$$

Consequently, the probability ($p_2$) of all x entries not being allocated to a specific block (bucket) of the hash table is:

$$p_2 = (1 - p_1)^x = \left(1 - \frac{1}{n}\right)^x \tag{2}$$

In other words, p2 is the probability that a specific block of the hash table will be empty.

The expected number of empty blocks ($m_1$) in the hash table is therefore:

$$m_1 = n * p_2 = n\left(1 - \frac{1}{n}\right)^x \tag{3}$$

And the expected number of occupied blocks ($m_2$) in the hash table is:

$$m_2 = n - m_1 = n\left(1 - \left(1 - \frac{1}{n}\right)^x\right) \tag{4}$$

Lastly, the expected number of hash collisions in the hash table is $$m_3 = x - m_2 = x - n\left(1 - \left(1 - \frac{1}{n}\right)^x\right) \tag{5}$$

In some embodiments, the present invention assumes that the number of entries, x, is a quarter of the total size of the cache, n. In other words, x=n/4 in these embodiments. In an embodiment such as this, the probability that a specific bucket of the hash table will be empty, from equation (2), is therefore:

$$p_2 = \left(1 - \frac{1}{n}\right)^x = \left(1 - \frac{1}{n}\right)^{\frac{n}{4}} = \left(\left(1 - \frac{1}{n}\right)^n\right)^{\wedge}\frac{1}{4} \tag{6}$$

Noting that:

$$\left(1 - \frac{1}{n}\right)^n \approx \frac{1}{e} = 0.36788 \ldots \tag{7}$$

From Equations (6) and (7), the probability of a particular bucket being empty in the hash table, when the number of entries is about ¼ of the cache size, is approximately:

$$p_2 = e^{1/4} \approx 0.7788 \tag{8}$$

The number of empty buckets, from Equation (3), is therefore roughly:

$$m_1 = n * p_2 \approx 4 * x * 0.7788 = 3.1152x \tag{9}$$

The expected number of buckets that are occupied is approximately:

$$m_2 = 0.8848x \tag{10}$$

And the expected number of collisions is approximately:

$$m_3 = 0.1152x \tag{11}$$

In other words, approximately ⅛ (i.e., $m_3/m_2$) of the filled buckets in the cache would have already faced hash collisions when the system only attempts to fill ¼ of the cache's capacity with entries.

In accordance with some embodiments, the present invention alleviates this issue by introducing multiple hash tables in a hierarchy. As discussed above in relation to FIGS. 1 and 2, the different hash tables have different hash functions and are of different sizes. In one embodiment, each successive layer of hash table can be smaller in size and still reduce the hash collision problem of the previous hash table significantly.

For example, for a 32 k cache, the first hash table may use a modulo hash function based on:

$$k = 2^{17} - 1 = 131,071 \tag{12}$$

According to Equation (11), i.e., assuming the number of entries to be placed in the cache is ¼ of the cache size, the number of expected collisions in this example is 0.1152x=0.1152(n/4)=3775.

With 3775 collided entries to be placed in the second (next) hash table, we can implement the second hash table using a modulo hash function based on:

$$k_z = 2^{15} - 1 = 32,767 \tag{13}$$

Using a similar calculation as above, the expected number of collisions in the second hash table is 209.

Repeating the above process for the subsequent hash tables, where the third hash table is based on $k_3=2^{14}-1=16,383$, and the fourth hash table is based on $k_4=2^{13}-1=8,191$, the probability of hash collision in the fourth hash table is significantly smaller than 1, such that the probability of a hash collision over all four hash tables (i.e., the entire cache), is significantly reduced (compared with having 3,775 collisions with a single hash table).

As discussed before, in the event that a hash collision does occur after going through every layer of the multi-level hash tables, the present invention may, in some embodiments, implement a small, content-addressable memory (CAM) within the cache to capture any left over entries. In other words, the collided entries after all four hash tables will simply be stored in the CAM, rather than in the hash tables. In some embodiments, CAMs are used for quick and efficient searching. For example, the search within the CAM can be conducted in approximately equal time complexity as the search in the multi-level hash tables, such that no further delays will be introduced by employing the CAM.

In one particular embodiment, the present invention implements four hash tables within the cache. The sizes of the hash tables in this particular embodiment are:

$k_1=131,071$ (a prime number)
$k_2=32,767$ ($=7*31*151$, an integer)
$k_3=16,383$ ($=3*43*127$, an integer)
$k_4=8,191$ (a prime number).

The sizes of the hash tables should, generally, be co-prime within each pair. In other words, the sizes of the hash tables are mutually prime. This ensures that the hash collisions (or "failures") of the different hash tables are independent of each other. For example, if two hash tables share a common prime factor—hash table size 6 and hash table size 9 share a common prime factor of 3—the failures of each hash table are dependent on each other, and the number of collisions will therefore not be minimized.

Figure 3:
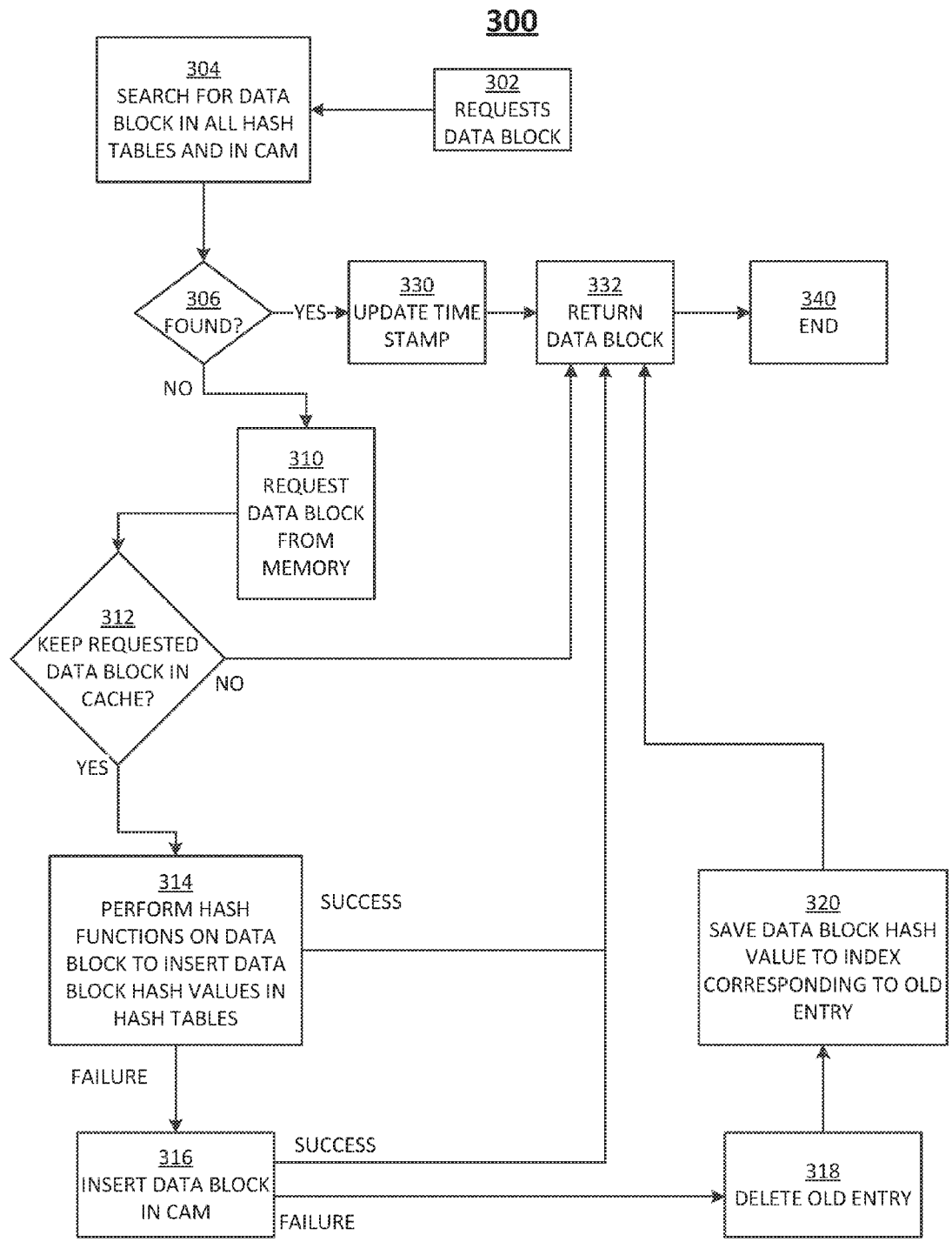
FIG. 3 is a flow diagram illustrating an implementation of a fast caching method according to the subject matter of this disclosure.

FIG. 3 is a flow diagram illustrating an implementation of a fast caching method according to the subject matter of this disclosure. Flow diagram 300 illustrates searching, inserting, and deleting entries from multiple hash tables of a cache. In some embodiments, each information block data entry of the hash tables in FIG. 2 includes a time stamp and a hash value. The hash value is generated by applying the hash function (corresponding to the particular hash table) on an incoming data block. In some embodiments, the incoming data block can be a 46-bit virtual address. In a simplified illustration, if the information data entry is "John Smith," the hash function corresponding to a particular hash table may compute a hash value of "5." The hash table, e.g., hash table 210 of FIG. 2, will attempt to store it in block 2 (under index "2"), because 5 mod 3=2. In this example, a time stamp, such as "12:03:02 PM, Apr. 10, 2016" may be stored along with the hash value "5" in block 2 of hash table 210. The purpose of storing hash values along with time stamps is to facilitate deletion of old entries, as will be explained in the process of FIG. 3.

At 302, processor 110 may request a data entry as part of its normal operation. For example, during the execution of a program in one embodiment, processor 110 may require the name "John Smith" for further processing. Either processor 110 or cache 120 may first search for the data entry among all hash tables and any associated CAMs. In some embodiments, processor 110 may search for the data entry "John Smith" among all 3 hash tables of FIG. 2, as well as the CAM within cache 120, and determine whether a match is found, at 306.

If the data entry is found in at least one of the hash tables or in the CAM, processor 110 or cache 120 may simply update the time stamp associated with the data entry, at 330, and return the data, at 332. For example, if the data entry "John Smith" is found on hash table 210 at index 2, along with the old time stamp of "12:03:02 PM, Apr. 10, 2016," processor 110 may update the time stamp to the current time, e.g., "12:05:38 PM, Apr. 10, 2016" and retrieve the copy of the name "John Smith" for the requesting program or application.

If, however, the data entry is not found anywhere in the hash tables or in the CAM, processor 110 or cache 120 may proceed to 310 and request the data from memory itself. In some embodiments, the memory may be a random access memory (RAM) or any other non-volatile memory unit. In general, the memory has a much larger capacity (size) than the cache, and can hold much more information at any given point of time than a cache can.

At 312, processor 110 may determine whether to keep a copy of the requested data in cache 120. In some embodiments, the determination is based on a caching algorithm. As illustrated before, the caching algorithm applied here can be any algorithm that relies on time of the entry. Example algorithms include LRU and other adaptive caching algorithms. If processor 110 determines that a copy of the requested data should be kept in cache 120, the data entry is sent to cache 120 for further processing, at 314. If, however, processor 110 determines not to keep a copy of the data entry in cache 120, processor 110 may simply return the data entry, at 332, and proceed to 340 to terminate the process.

At 314, cache 120 or processor 110 may perform hash functions on the data entry to attempt to insert it in one of the hash tables. Cache 120 or processor 110 may perform a first hash function on the data entry to attempt to insert its corresponding hash value at a first index (or "bucket") of the first hash table. For example, the first hash function may be performed based on a prime number (e.g., $K_1=131,071$). If the first index is occupied on the first hash table (i.e., a collision occurred), cache 120 or processor 110 may perform a second hash function on the data entry to attempt to insert its hash value to a second index of the second hash table. As an example, the second hash function may be performed based on an integer—either another prime number (e.g., $K_4=8,191$) or a composite number (e.g., $K_2=32,767$). This process goes on until the hash value is successfully inserted into one of the hash tables, or if collisions occurred in each and every hash table of cache 120.

In the event that the hash value is successfully inserted into one of the hash tables, cache 120 or processor 120 may proceed to 332 to return the data entry. In some embodiments, cache 120 or processor 110 may insert the hash value along with a time stamp, such as the date and time of the current operation. For example, cache 120 may be able to successfully insert the data entry "Adam Johnson" under index 3 of hash table 230, along with the time stamp "10:02:01 AM, Apr. 20, 2016," and return the data entry "Adam Johnson" to the requesting program.

In the event that the hash value is not successfully inserted into any of the hash tables, cache 120 or processor 110 may attempt to insert the data entry into the CAM, at 316. Once the insertion to the CAM is successful, cache 120 or processor 110 may return the data entry as usual. However, if, for example, the CAM is full or insertion to the CAM is otherwise not successful, cache 120 or processor 110 may have to delete an old entry from the hash table, at 318. In some embodiments, deletion of old entries may not necessarily be performed when each and every hash table, including the CAM, is full. In some embodiments, deletion of old entries can be performed at the beginning of the process, after searching at 304 is completed, or at any other point during process 300.

In some embodiments, once an old entry is deleted, cache 120 or processor 110 may save (or re-direct) the pointer of the old entry to the current data entry. In other words, cache 120 or processor 110 may, at 320, save the hash value of the data at the index corresponding to the old entry in the hash table. For example, if an old entry from hash table 220, at index 5 (corresponding to "John Smith") is deleted, cache 120 may save the new data entry, "Adam Johnson," to index 5 at hash table 220. In some embodiments, once the new data entry is saved, the new data entry can be returned to the requesting program, and the process ends at 340.

The systems and methods as described above can be implemented easily in hardware. For example, access to array elements by index can be accomplished by a simple adder. A binary content-addressable memory (BCAM) is easily implemented within the cache itself.

Traditional hardware implementations of cache systems are bottlenecked in two common areas: power consumption and clock cycles. For instance, division is an expensive operation both in terms of power and in terms of time (clock cycles), because division operation is sequential in nature and not easy to speed up. However, in some implementations of the present invention, calculations are done using hash tables having sizes of $2^n-1$. This helps break down expensive calculations in a binary system, such as divisions, into a number of blocks of n bits, which are added together. A divisional problem is therefore simplified and can be implemented by several binary adders. In some embodiments, this system can be implemented based on $2^n+1$ hash tables as well.

Thus it seen that methods and apparatus for performing fast caching have been provided.

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:
1. Computing circuitry for fast caching, comprising:
a memory that stores a data block;
a processor that:
retrieves the data block from the memory, and
determines whether to store the data block in a cache; and
the cache that:
performs a first hash function, based on a prime number, on the data block in response to the processor determining to store the data block in the cache, and
performs a second hash function, based on an integer that is co-prime with the prime number, on the data block if the first hash function results in collision.
2. The computing circuitry of claim 1, further comprising a content-addressable memory that stores the data block if the second hash function results in collision.
3. The computing circuitry of claim 1, wherein the cache performs the first hash function based on the prime number by:
evaluating a number of buckets corresponding to a first hash table in the cache, wherein the number of buckets equals the prime number;
performing the first hash function on the data block to generate a hash value;
generating an index based on the prime number and the hash value; and
determining whether a bucket corresponding to the index is available.
4. The computing circuitry of claim 1, wherein the cache has a size that is greater than or equal to a sum of the prime number and the integer.
5. A method for fast caching in a computing system, the method comprising:
retrieving a data block from a memory;
determining whether to store the data block in a cache;
performing a first hash function, based on a prime number, on the data block in response to determining to store the data block; and
performing a second hash function, based on an integer that is co-prime with the prime number, on the data block if the first hash function results in collision.
6. The method of claim 5, further comprising:
storing the data block in a content-addressable memory if the second hash function results in collision.
7. The method of claim 5, wherein performing the first hash function based on the prime number further comprises:
evaluating a number of buckets corresponding to a first hash table in the cache, wherein the number of buckets equals the prime number;
performing the first hash function on the data block to generate a hash value;
generating an index based on the prime number and the hash value; and
determining whether a bucket corresponding to the index is available.
8. The method of claim 5, wherein the cache has a size that is greater than or equal to a sum of the prime number and the integer.
9. Computing circuitry for fast caching, comprising:
a cache;
a memory that stores a data block; and
a processor that:
retrieves the data block from the memory,
determines whether to store the data block in the cache,
performs a first hash function, based on a prime number, on the data block in response to determining to store the data block in the cache, and
performs a second hash function, based on an integer that is co-prime with the prime number, on the data block if the first hash function results in collision.
10. The computing circuitry of claim 9, further comprising a content-addressable memory that stores the data block if the second hash function results in collision.
11. The computing circuitry of claim 9, wherein the processor performs the first hash function based on the prime number by:
evaluating a number of buckets corresponding to a first hash table in the cache, wherein the number of buckets equals the prime number;
performing the first hash function on the data block to generate a hash value;
generating an index based on the prime number and the hash value; and
determining whether a bucket corresponding to the index is available.

12. The computing circuitry of claim 9, wherein the cache has a size that is greater than or equal to a sum of the prime number and the integer.

\* \* \* \* \*